UNITED STATES PATENT OFFICE.

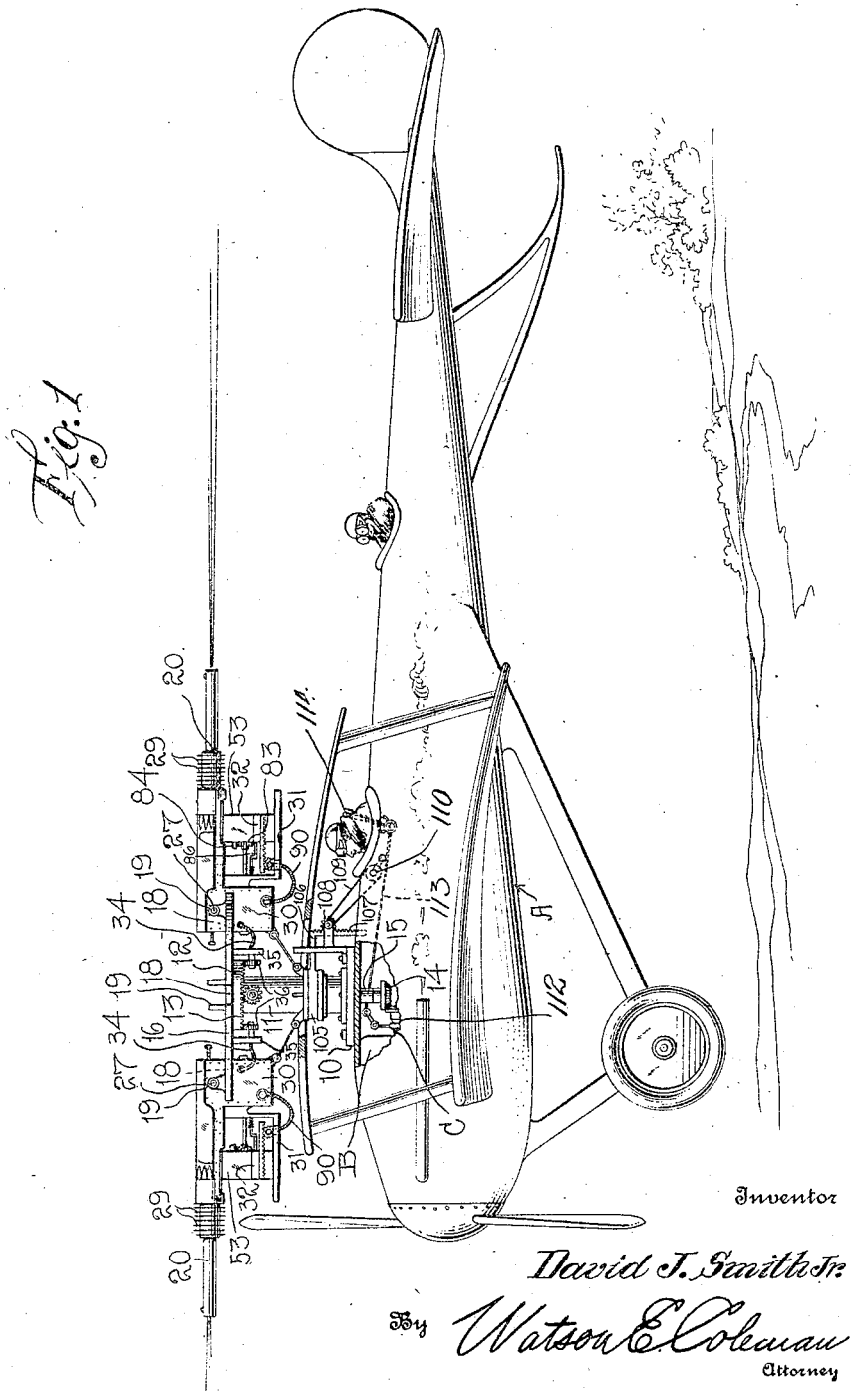

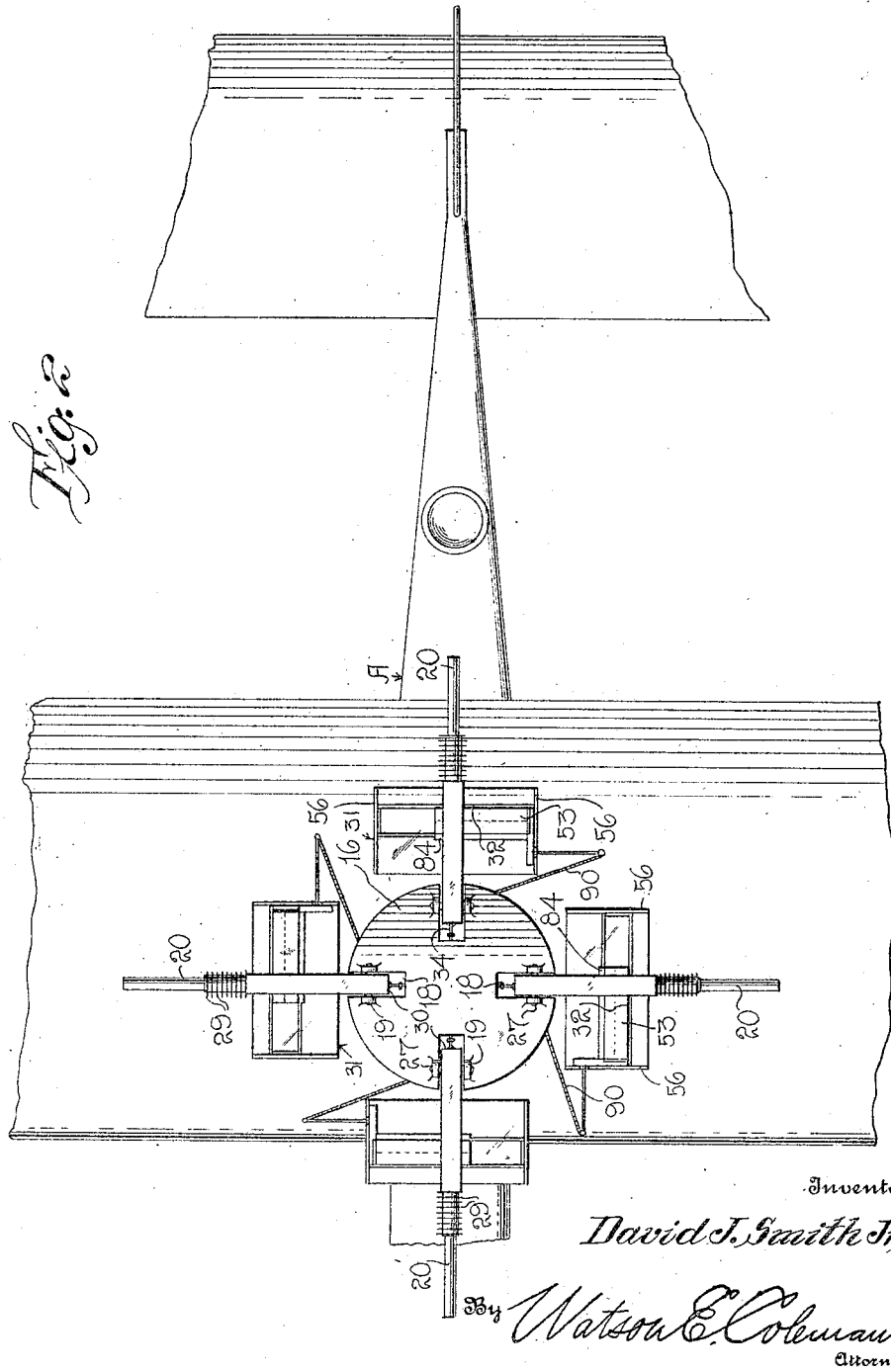

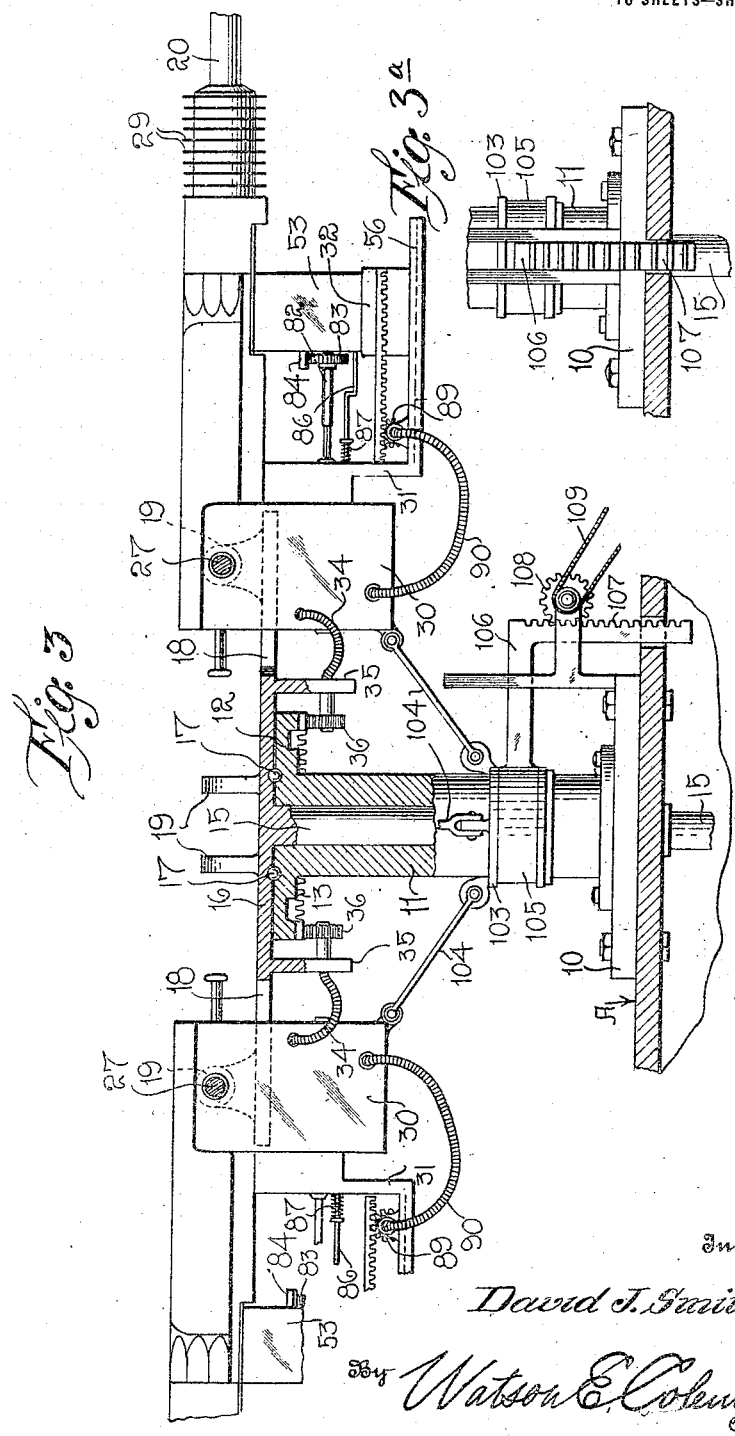

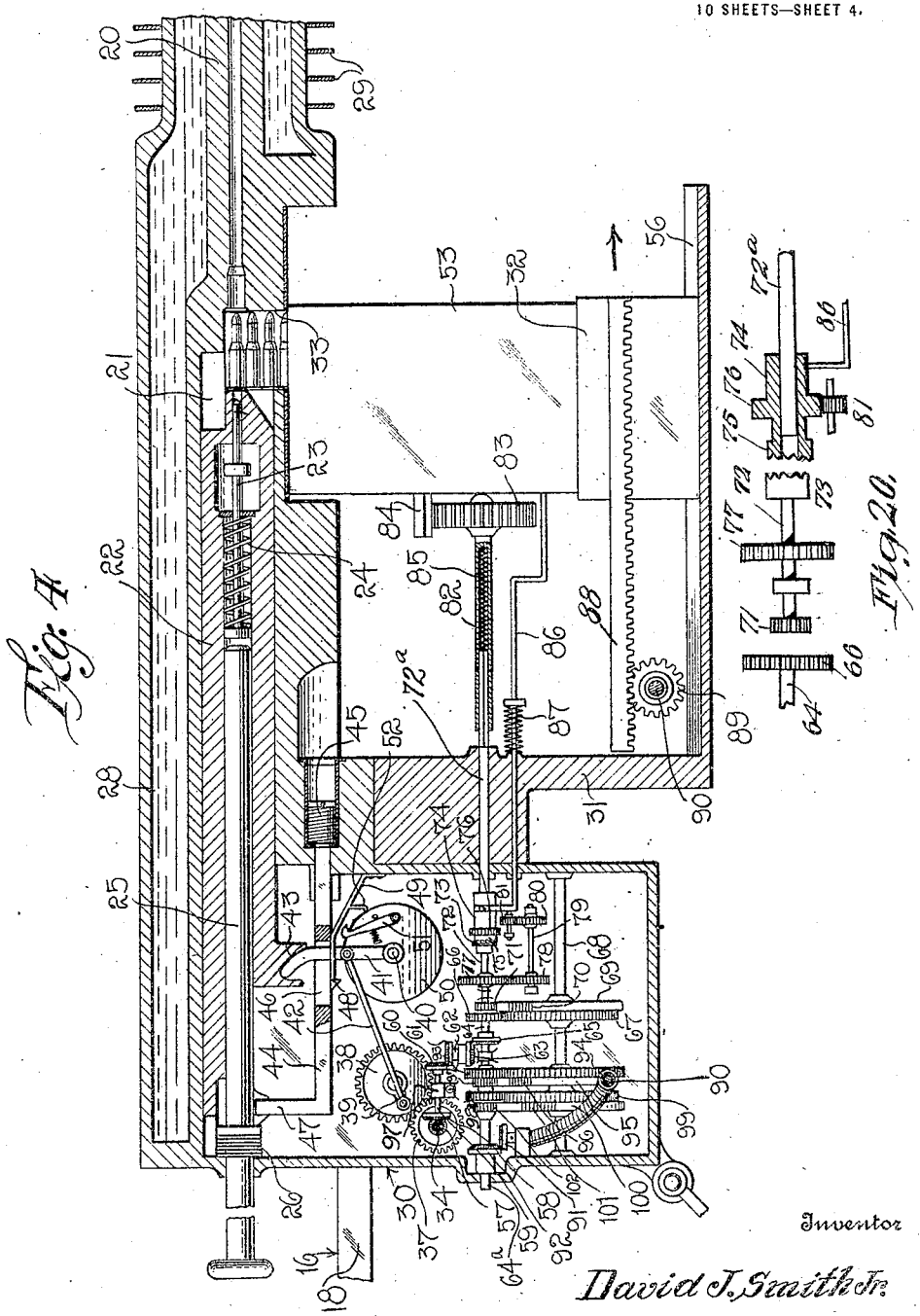

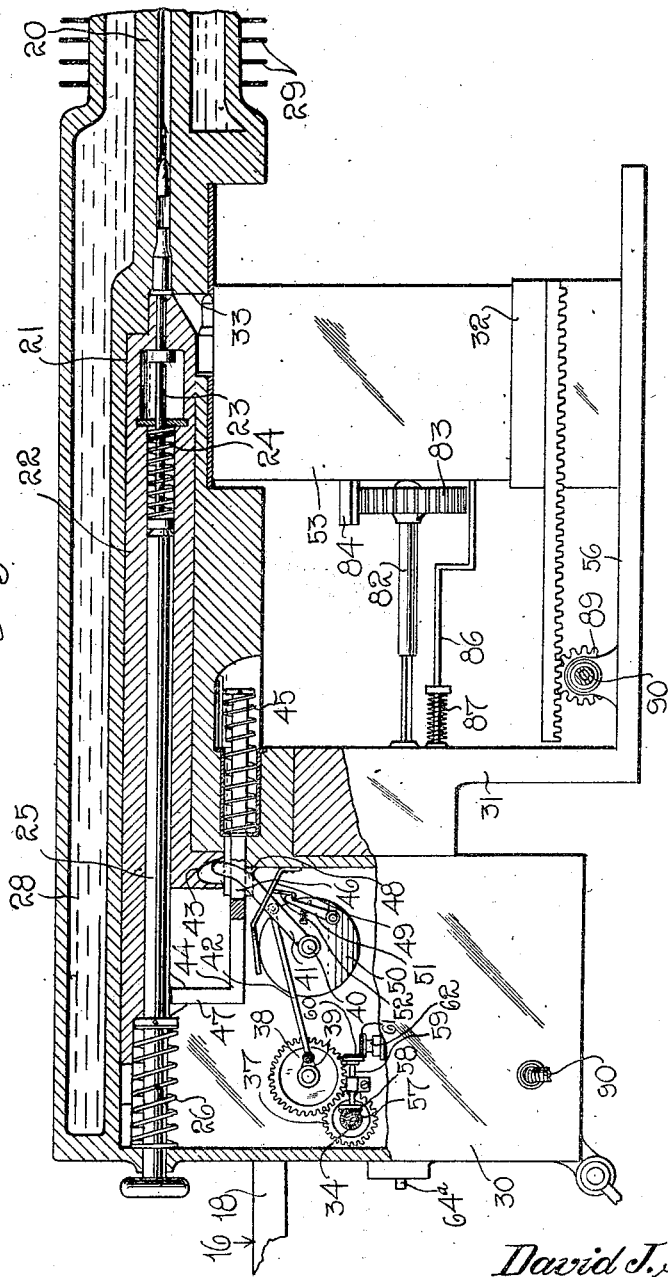

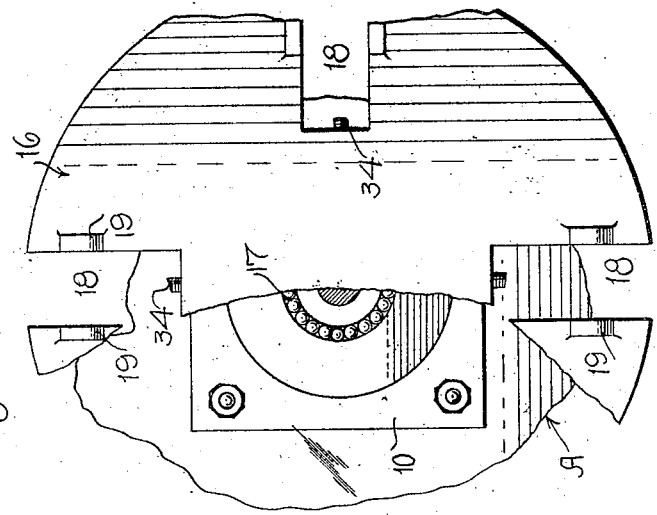
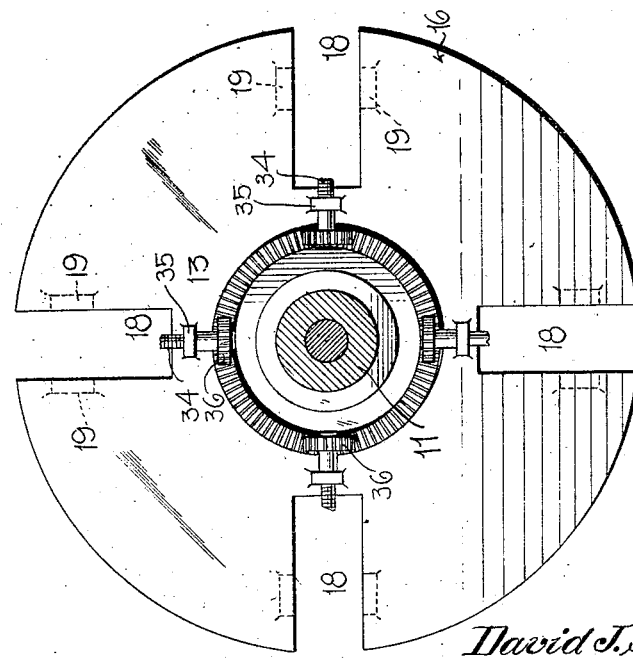

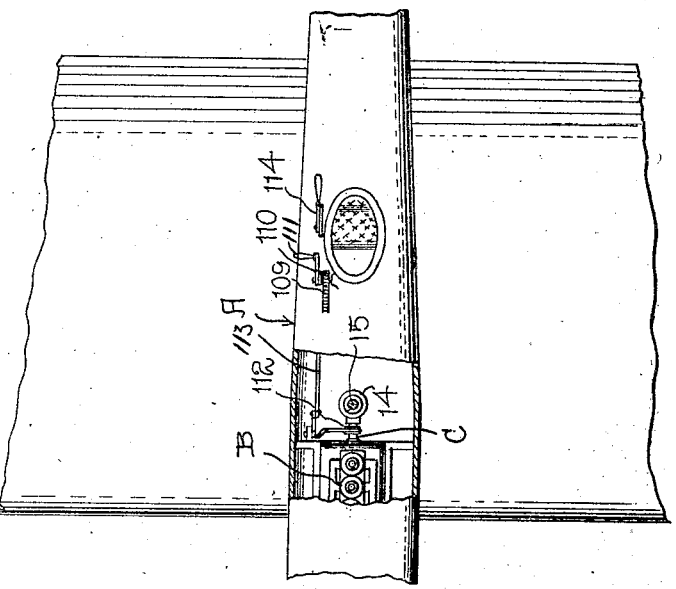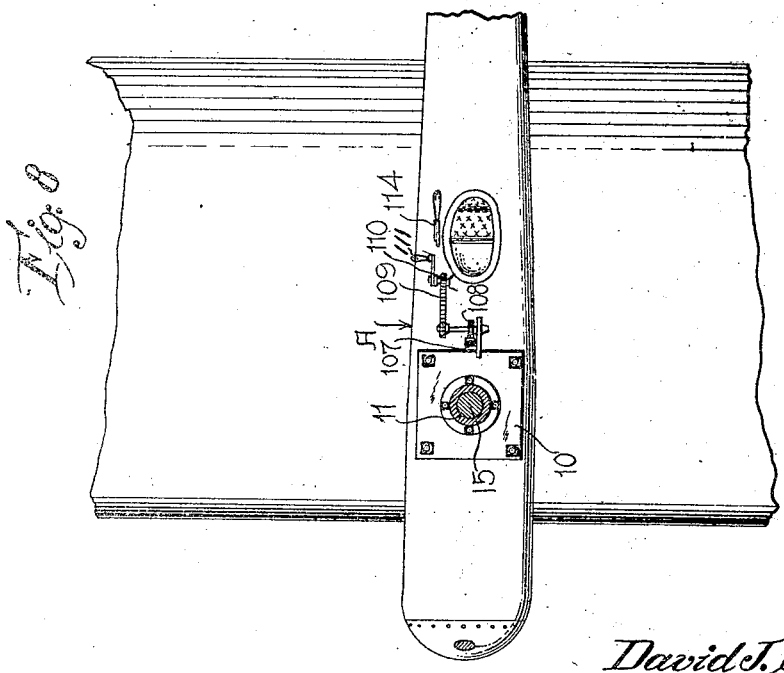

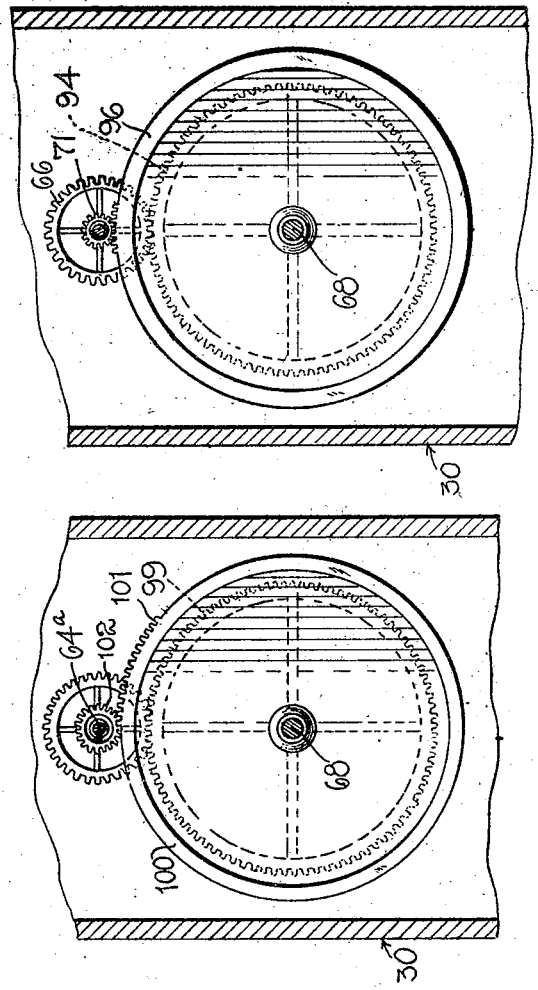

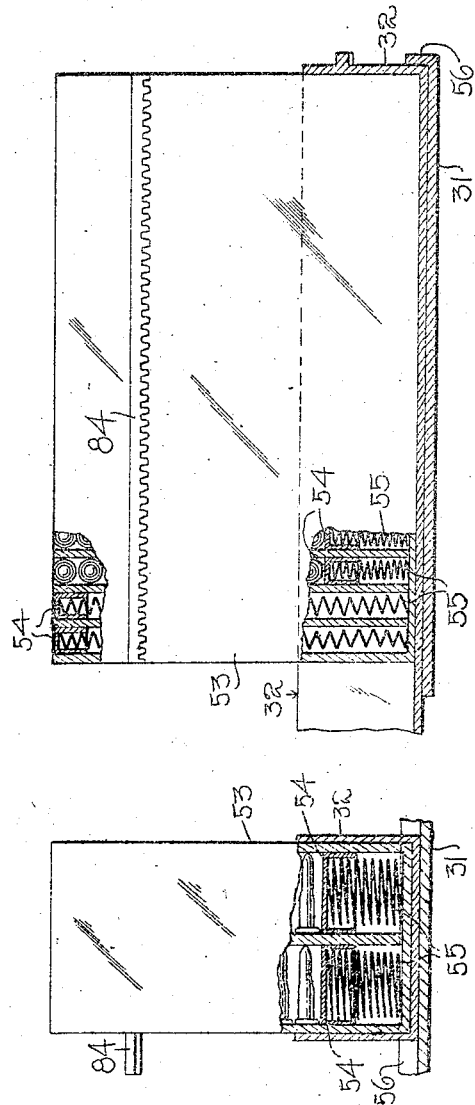

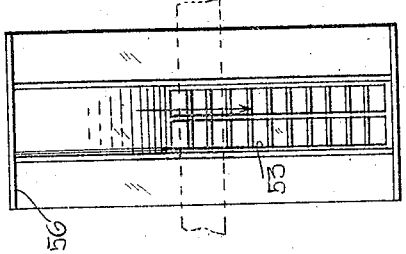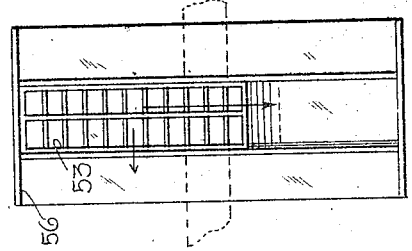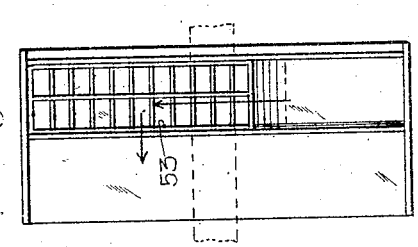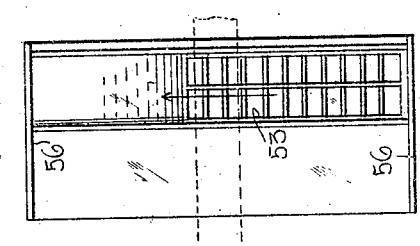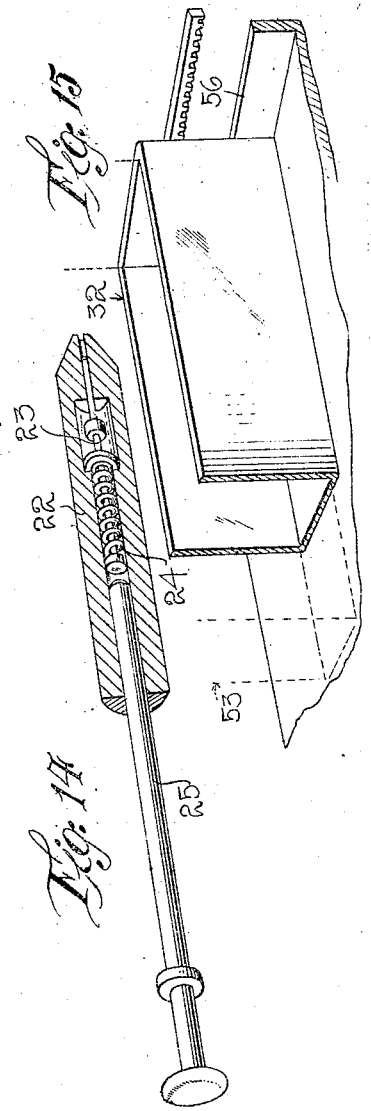

DAVID J. SMITH, JR., OF WASHINGTON, DISTRICT OF COLUMBIA.

MOTOR-OPERATED GUN.

1,352,319.  Specification of Letters Patent.  Patented Sept. 7, 1920.

Application filed November 9, 1918. Serial No. 261,877.

*To all whom it may concern:*

Be it known that I, DAVID J. SMITH, Jr., a citizen of the United States, residing at Washington, in the District of Columbia, have invented certain new and useful Improvements in Motor-Operated Guns, of which the following is a specification, reference being had to the accompanying drawings.

This invention relates to guns, and particularly to revolving guns.

The general object of the invention is to provide upon an aeroplane or any other suitable support, such as an armored car, for instance, a plurality of guns mounted for revolution in a horizontal plane and provide mechanism whereby the guns shall be fired automatically as the guns revolve, the elevation or depression of the guns being within the control of the aviator or gunner and the operation of the guns being also within his control.

A further object of this invention is to provide means whereby power may be transmitted from the engine of the aeroplane, armored car or other like gun mount to the gun for the purpose of rotating and actuating the firing and feeding mechanism thereof.

A further object is to provide very simple means whereby the breech block or bolt of the gun may be alternatively projected and retracted and the firing pin alternately retracted and projected, the mechanism being actuated continuously as the guns are rotated.

Still another object is to provide a novel form of magazine for feeding cartridges to the gun and novel means for actuating the magazine.

A further object is to provide a gun of the character stated mounted upon an aeroplane, for instance, so that the aeroplane may land within the enemy's lines and then create a zone of fire entirely around the aeroplane to the extent of the gun range.

Other objects will appear in the course of the following description.

My invention is illustrated in the accompanying drawings, wherein:—

Figure 1 is a side elevation of an aeroplane equipped with my improved gun;

Fig. 2 is a top plan view of the construction illustrated in Fig. 1;

Fig. 3 is a fragmentary side elevation, partly in section, of the gun mount and guns carried thereby;

Fig. 3ᵃ is a fragmentary elevation of a portion of the gun elevating and depressing means;

Fig. 4 is a longitudinal vertical section through one of the guns showing the breech block and bolt retracted;

Fig. 5 is a like view to Fig. 4 but showing the breech block closed and the bolt projected to explode the cartridge;

Fig. 6 is a section on the line 6—6 of Fig. 3 looking in the direction of the arrows;

Fig. 7 is a fragmentary top plan view of the gun platform partly broken away;

Fig. 8 is a fragmentary top plan view of the aeroplane with the supporting posts of the gun mount in section showing the means whereby the elevation of the gun can be controlled;

Fig. 9 is a fragmentary top plan view of an aeroplane partly broken away to show the engine and the means whereby the driving mechanism of the gun may be disconnected from the crank shaft of the engine;

Figs. 10 and 11 are side elevations of the gearing for controlling the magazine, the gear housing being shown in section;

Fig. 12 is an end elevation of the magazine partly in section;

Fig. 13 is a side elevation of the magazine partly in section;

Fig. 14 is a fragmentary perspective view of the breech block, firing pin and bolt;

Fig. 15 is a fragmentary perspective view of the magazine;

Figs. 16, 17, 18 and 19 are diagrammatic top plan views showing the manner in which the magazine travels;

Fig. 20 is a fragmentary elevation of shafts 64, 72 and 72ᵃ showing the gear wheels thereon and showing the sleeve 74, the gear wheel thereon and the clutch member 75 in section.

Referring to Figs. 1 and 3, A designates the fuselage of an aeroplane of any suitable construction having the usual cockpits for the accommodation of the aviator and an observer and driven by the engine B having the crank shaft C (see Fig. 9). Mounted upon the fuselage and bolted thereto is a base plate 10 from which extends a vertical tubular column 11 flanged at its upper end as at 12 and formed with an annular gear having downwardly projecting teeth 13. Passing through the column from top to bottom thereof and carrying at its lower end a beveled gear wheel 14 is a driving shaft 15 which at its upper end is connected to the gun platform 16. This gun platform is mounted on ball bearings 17 so as to rotate freely upon the column 11 and to have a firm bearing on this column 11.

At a plurality of points this gun platform 16 as illustrated in Fig. 6, is radially slotted as at 18 for the accommodation of the rear portions of the several guns. Bearings 19 are formed upon the gun platform on each side of each slot through which the trunnions of the guns pass. Each of the guns, as illustrated most clearly in Figs. 4 and 5, comprise a water cooled barrel 20, which at its rear end opens into a chamber 21 wherein is disposed the breech block 22. This breech block is tubular, as usual, and carries at its forward end the firing pin 23 which is held in a retracted position by the spring 24. Also mounted in the breech block for reciprocation therethrough is the bolt 25 adapted to impinge upon the firing pin and project it against the cartridge. This bolt is urged forward by means of a spring 26. The trunnions 27 are formed upon the body of the gun and engage the ears or bearings 19 so that the gun may be elevated or depressed.

I have illustrated the barrel of the gun and the breech mechanism of the gun as being inclosed within a water jacket 28 which at its forward portion is provided with cooling fins 29 but I do not wish to be limited to this, as any method of cooling the gun may be used.

Extending downward from the rear portion of the barrel is a housing 30 designed to contain the firing mechanism of the gun and extending downward below the forward portion of the breech is a support 31 for the magazine 32. The breech of the gun is provided with a port 33 whereby shells or cartridges are discharged from the magazine into the chamber 21 when the breech block is retracted as will be later described.

The breech block is alternately retracted and projected by means of a flexible shaft 34, there being one for each of the guns, each flexible shaft extending inward through a bearing in a bracket 35 and carrying on its end a pinion 36 which meshes with the annular gear wheel 13. It will thus be obvious that as the gun platform is rotated the gears 36 and the shafts 34 of all the guns will be driven. Power is transmitted from each flexible shaft 34 to a gear wheel 37 which in turn transmits its power to a gear wheel 38 mounted on a suitable stub shaft carrying a crank 39. Mounted in the housing 30 is a rock shaft 40 having a radially extending arm 41 which is connected to the crank 39 by means of a connecting rod 42.

It will be obvious now that as the crank 39 rotates the arm 41 will be rocked back and forth. This arm 41 at its upper end is formed to engage within a recess 43 in the breech block 22 so that as the arm oscillates the breech block will be alternately retracted and projected to cause the breech block to open the breech to permit the insertion of the cartridge and then close the breech. For the purpose of holding the hammer or bolt 25 retracted while the breech block moves forward and then releasing the bolt 25 to permit it to impinge upon the firing pin, I provide the longitudinally shiftable rod 44 which is urged forward by means of a spring 45 and which is drawn rearward by the arm 41, this arm passing through a slot 46 in the rod 44. The rear end of this rod 44 is upwardly extended as at 47 and engaged in any suitable manner with the bolt 25. The rod 46 is formed with a downwardly extending tooth 48 and coacting with this tooth is a resilient detent 49. The tooth 48 is beveled so that upon a rearward movement of the rod 44 the tooth 48 will depress the free end of the detent 49 but after the tooth has passed the detent, the detent will spring into place before the tooth and hold the rod 44 and the bolt 25 retracted.

As soon as the breech block has closed, it is necessary to release the detent 49 to permit the bolt to be projected by its spring 26 against the firing pin and to this end I mount upon the rock shaft 40, the disk 50 having thereon a hook 51 which engages with a downwardly and rearwardly extending hook 52 mounted on the detent 49. When the arm 41 is in its rearward position and the breech block is retracted, the hook 51 will also be swung rearward out of engagement with the hook 52 but when the breech block has been closed, the hook 51 will engage the hook 52 and retract the detent 49, thus permitting the bolt 25 to spring forward and strike the firing pin and explode the cartridge. Of course upon the reverse movement of the disk 50 the hook 51 simply releases engagement with hook 52 and takes up its position rearward of the hook so as to repeat the operation.

The magazine 32, as illustrated in Figs. 16 to 19, is formed of an outer casing, which is the casing designated 32, and slidably mounted within this outer casing for movement transverse to the gun is a box or casing 53 which is illustrated as containing twenty vertical compartments, each of these compartments being adapted to hold ten cartridges, the cartridges being disposed one on top the other as illustrated in Figs. 12 and 13 and urged upward by means of followers 54, one for each compartment, these followers being forced upward by means of springs 55. For the sake of simplifying the drawings, I have illustrated the case or box 53 as being formed with twenty compartments divided into two transverse rows, each row containing ten compartments, but it is to be understood that I may have any number of rows and that each row may contain more than ten compartments and that each compartment may be designed to contain more or less than ten cartridges. With ten cartridges in each compartment, there will be two hundred cartridges in each magazine or case 53.

It is necessary, of course, that the case 53 shall be capable of two movements, one transverse to the barrel of the gun, and the other parallel to the barrel of the gun. In other words, where ten shots are fired and one compartment is emptied, the box 53 should move transversely one step so as to bring a second compartment of the same row into line with the gate 33 and then when the cartridges in this compartment have been used, that the box should move laterally in the same direction another step, and so on until all of the cartridges in a row (one hundred cartridges in Figs. 16 to 19) have been used. It is then necessary that the box 53 should move parallel to the gun one step so as to bring the second line of compartments into alinement with the gate 33 and that then the box 53 should move transversely of the barrel step by step until the compartments of the second row have been exhausted and so on if there are more than two rows.

The mechanism whereby this is accomplished is as follows: The magazine 32 is mounted for movement parallel to the length of the gun barrel on the supporting member 31 and preferably moves on tracks 56, while the box 53 has a length equal to approximately half the length of the magazine body 32 so that it may move transversely of the barrel from the position shown in Fig. 16 to that shown in Fig. 17 and from the position shown in Fig. 18 to that shown in Fig. 19.

The means whereby these two movements of the magazine are secured is as follows: Referring to Figs. 4 and 5, it will be seen that the shaft 34 carries upon it a beveled gear wheel 57 which meshes with a beveled gear wheel 58 having the same diameter, carried upon a shaft 59, which also carries upon it the beveled gear wheel 60, which engages with a beveled gear wheel 61 mounted upon the shaft 62 carrying the beveled gear wheel 63. Extending parallel to the barrel of the gun is a shaft 64 and mounted upon this shaft is a beveled gear wheel 65 meshing with the beveled gear wheel 63. Mounted upon the shaft 64 is a pinion 66 which in turn engages with a relatively large gear wheel 67 rotating loosely on a shaft 68. This gear wheel 67 has a diameter ten times larger than the gear wheel 66 so that one rotation of the gear wheel 66 will give one-tenth of a full rotation of the gear wheel 67. Also loosely mounted upon the shaft 68 and rotating with the wheel 67 is a gear wheel 69 having a single short series of teeth 70 which are adapted to mesh with a pinion 71, once in every rotation of the gear wheel 69, the pinion 71 being carried on a shaft 72 which carries upon it a fixed clutch member 73. Surrounding a shaft $72^a$ in line with shaft 72, is a sleeve 74 which is splined upon the shaft $72^a$ so that the shaft 72 rotates with the sleeve and mounted upon the sleeve 74 is a clutch member 75 which engages with the clutch member 73 and carries a gear wheel 76. When the clutch 75 is in engagement with the clutch 73 the shaft $72^a$ will be driven directly from the shaft 72. Mounted on the shaft 72 is a gear wheel 77 which engages the gear wheel 78 on a counter-shaft 79 which carries a pinion 80 engaging with an intermediate gear wheel 81, which in turn is engageable with the gear wheel 76 on the clutch member 75 when the clutch member is shifted to the right in Fig. 4.

The shaft 64 is designed to make one complete rotation for each complete rotation of the shaft 34 and thus to rotate simultaneously and at the same rate of speed as the gear wheel 38. Inasmuch as the gear wheel 69 has teeth at only one point and gear wheels 67 and 69 will rotate ten times slower than the shaft 64, it is obvious that the teeth 70 of wheel 69 will cause a rotation of the shaft 74 once for each ten rotations of the shaft 64 so that after ten cartridges have been fired the shaft 74 will rotate once and lateral movement will be transmitted to the box 53 by means of the telescopic extension 82 of the shaft 74 which carries upon it the gear wheel 83 engaging a rack 84 on the box 53. A spring 85 disposed within the telescopic extension urges the extension outward so that the gear wheel 83 will travel with the box 53.

The clutch member 75 is shifted by means of a shipper rod 86 urged outward by a spring 87 so as to bear against the box 53. When the box 53 is in the position shown in Fig. 4, the shaft $72^a$ will be rotated directly through clutch members 73 and 75 in one direction. When, however, the box 53 has reached the end of its movement in one direction and is shifted longitudinally in the direction of the arrow, Fig. 4, by means which will now be described, the shipper rod 86 will shift the clutch member 75 to move outward by reason of the spring 87 so as to engage the gear wheel 76 with the intermediate gear wheel 81 and thus the motion of the gear wheel 83 will be reversed.

For the purpose of giving a longitudinal movement to the magazine carrier 32 I mount upon this carrier the rack 88 which is engaged by a gear wheel 89 driven by a flexible shaft 90 having at its end a gear wheel 91 engaging with the gear wheel 92 which is splined on shaft 64ᵃ, which shaft is loosely sleeved in shaft 64. A complete rotation of the gear wheel 89 must be given after one hundred shots have been fired, that is, after the gear wheel 38 has revolved one hundred times. To this end I mount upon the shaft 64 the pinion 93 which engages with the gear wheel 94, ten times larger than the gear wheel 93 and rotating loosely on the shaft 68, this gear wheel 94 having attached to it the gear wheel 95 having a single short series of teeth 96 which is adapted to mesh with a gear wheel 97 carried loosely upon the shaft 64 and which communicates its motion to the gear wheel 98 also loose on the shaft 64 engaging with a relatively large gear wheel 99 which in turn is attached to a gear wheel 100 having a single series of teeth 101 which mesh with a pinion 102 on the shaft 64ᵃ upon which the beveled gear wheel 92 is mounted. It will therefore be obvious that ten rotations of the shaft 64 will cause one rotation of the gear wheel 94 and one complete rotation of the gear wheel 94 will cause the pinion 97 to rotate once. Thus the pinion 97 will rotate once for every ten shots. One hundred shots will cause the complete rotation of the gear wheel 99 and a complete rotation of the pinion 102 and, of course, a complete rotation of the gear wheel 89, which will be sufficient to carry the magazine 32 from the position shown in Fig. 17 to that shown in Fig. 18, thus bringing the second row of cartridge compartments into line with the gate or opening 33 whereby the cartridges are discharged into the barrel.

For the purpose of elevating and depressing the guns which are mounted upon the rotatable gun platform, I have illustrated in Fig. 3 the column 11 as being provided with a vertically slidable annulus 103 which carries links 104 which are pivotally connected to the annulus and to the housings 30 of the several guns and I have illustrated the ring 103 as being rotatable around the column 11 and as being engaged by a loose ring 105 having an arm 106 formed with a downwardly extending rack 107 which is engaged by a pinion 108 driven by means of a sprocket chain 109 from a sprocket wheel 110 mounted on a crank shaft 111 within the control of the aviator, as shown in Fig. 8. By this means the guns may be depressed or elevated according to conditions, without interfering in any way with the free rotation of the guns.

In order that the rotation of the guns may be stopped and that the firing may be stopped whenever desired, I provide a clutch 112 on the crank shaft C whereby the crank shaft may be operatively disengaged from the vertical shaft 15, this clutch being adapted to be operated by means of a clutch shifting mechanism which includes an actuating rod 113 and lever 114 disposed adjacent to the cockpit as illustrated in Fig. 9.

The operation of the invention will be obvious from what has gone before. The guns may be left at rest and inoperative until the aviator has flown above the enemy army and a sufficient distance inside the enemy lines and then without alighting the aviator may depress the guns and throwing in the clutch 112 cause the guns to revolve and fire, thus creating a circular zone of fire around the machine. If the aviator can land within the enemy lines, the guns may be so turned as to be extremely destructive within the circle of fire range revolving constantly as they do, and as each gun, as illustrated, is capable of firing two hundred rounds the four guns will, of course, fire eight hundred projectiles radially. It will be understood, however, that I do not wish to limit myself to the use of a magazine containing two hundred cartridges to each gun as it is obvious that the magazine may be constructed to contain many more than this number. Neither do I wish to confine myself to the use of four guns, as more guns may be used and thus the destructiveness greatly increased.

While I have heretofore described the gun as being mounted upon an aeroplane, it is obvious of course that it may be mounted upon an armored car, or upon any other suitable mount. Neither do I wish to limit myself to any particular form of gun, as the main point of my invention lies in mounting a plurality of rotatable guns upon an aeroplane or like supporting means and rotating these guns rapidly and automatically firing the guns as they are rotated.

While I have illustrated also a particular means of transmitting motion from the flexible shaft 34 to the shafts 82 and 90, it will be obvious that any other step by step speed reducing mechanism may be used for this purpose and that it is within the scope of my invention to transmit motion to the magazine actuating gears by any mechanism which will accomplish the end sought.

I claim:—

1. The combination with a motor driven vehicle including a motor having a shaft, of a tubular column supported upon the vehicle and having an annular gear wheel concentric to the axis of the column, a rotatable shaft passing through the column and operatively geared to the motor shaft, a platform carried by the rotatable shaft, guns mounted upon the platform, gear wheels, one for each gun, carried by the platform and operatively engaging the annular gear wheel on the column, and means operated by said gear wheels for firing the several guns.

2. The combination with a motor driven vehicle having a motor and a driving shaft, of a tubular column carried by the vehicle, a shaft operatively engaged with the drive shaft and extending through said column and carrying a gun platform, a plurality of guns mounted upon said platform, a reciprocating breech block and firing bolt in each gun, and means for causing the reciprocation of the breech block and the bolt including an annular gear wheel carried by the column, a plurality of pinions one for each gun carried by the platform and engaging said annular gear wheel, driving shafts engaged by the pinions, oscillating arms, one for each gun, engaging with the breech block, means driven by the said driving shafts for oscillating said arms and retracting the firing bolt upon the retraction of the breech block, a spring urging each firing bolt to a projected position, a detent engageable with the firing bolt upon its retraction and holding the bolt from forward movement with the breech block, and means for retracting said detent from its operative engagement with the firing bolt when the breech block has reached its closed position.

3. Mechanism of the character described including a tubular column, a vertical shaft passing through the column, motor driven means for rotating said shaft, a gun platform mounted upon the shaft for rotation therewith, a plurality of guns mounted for rotation with the column, mechanism actuated by rotation of the guns for firing the guns as the platform is rotated, pivotal means for supporting the guns, and means for elevating or depressing the guns including a collar mounted for rotation with the column and shiftable vertically, operative connections from the collar to the several guns, to thereby tilt the guns upon a longitudinal movement of the collar, and manually operable means for vertically shifting the collar.

4. A mechanism of the character described including a vertical tubular column having an annular fixed gear wheel, a driving shaft extending through the column and adapted to be connected to a source of power and carrying a gun platform, guns mounted upon the platform for rotation therewith, each gun having a barrel, a reciprocable breech block coacting therewith, a reciprocable firing bolt mounted in the breech block, a rock shaft having an arm engageable with the breech block and acting to open or close the breech block as the shaft is rocked, a rod operatively engaged with the firing bolt and shifted rearward by said arm, the rod having free movement forward independent of the firing bolt, a spring actuated detent engageable with the rod to hold the firing bolt retracted, a spring urging the firing bolt to a projected position, a disk mounted on the rock shaft, a member carried by said disk and operatively engageable with the detent to retract it when the arm has reached a position where the breech block is fully projected, and means for rocking said shaft including a crank shaft operatively connected to the rock shaft, a pinion engaging with the annular gear carried by the column, and means for transmitting power from said pinion to the crank shaft.

5. The combination with a rotatable gun platform and guns carried thereby, of motor operated means for rotating the platform and automatically firing the guns, a magazine coacting with each gun and traveling beneath each gun, and means driven by the actuating motor for shifting said magazine with relation to the gun.

6. The combination with a rotatable gun platform and guns carried thereby, of motor operated means for rotating the platform and automatically firing the guns, a magazine coacting with each gun, the magazine having a plurality of vertical compartments arranged in rows, each compartment being adapted to contain a plurality of cartridges, spring compressed followers in the compartments urging the cartridges upward and into the gun, and mechanism operatively connected to the driving motor and operatively driven thereby, acting upon the firing of the gun a predetermined number of times to shift the magazine one step to bring fresh compartments of any row of compartments into operative position, and mechanism operating after all the compartments of a row have been emptied to shift the magazine one step in a direction at right angles to its first movement to bring the second row of compartments into operative position.

7. In a gun, a tubular column, a motor driven shaft extending through said column and carrying a gun, a platform, a plurality of guns mounted on the platform, a reciprocating breech block and firing bolt in each gun, means for causing the reciprocation of the breech block and the bolt including an annular gear wheel carried by the column, a plurality of pinions, one for each gun, carried by the platform and engaging said annular gear wheel, driving shafts engaged by the pinions, oscillating arms, one for each gun, engaging with the breech block, means driven by the driving shafts oscillating said arms and retracting the firing bolt upon the retraction of the breech block, a spring urging each firing bolt to a projected position, a detent engaging with the firing pin upon its retraction and holding the bolt from forward movement with the breech block, means for reciprocating said breech block when the breech block has reached its closed position, a shiftable magazine for each gun disposed below the breech thereof, each magazine having a plurality of vertical cartridge compartments arranged in rows, followers in said compartments urging the cartridges therein into the breech of the gun, means operated by the driving shaft of each gun automatically shifting the magazine one step in one direction after a predetermined number of revolutions of the driving shaft, automatically shifting the magazine in a direction at right angles to the first named direction after a predetermined number of revolutions of the driving shaft and automatically shifting the magazine step by step in a direction parallel to the first named direction but reversely thereto.

In testimony whereof I hereunto affix my signature in the presence of two witnesses.

DAVID J. SMITH, Jr.

Witnesses:
F. B. WRIGHT,
FREDERICK S. STITT.